United States Patent [19]

Buder et al.

[11] 4,378,301
[45] Mar. 29, 1983

[54] DISCHARGE RESERVE FOR NEGATIVE IMPREGNATED SINTER TAPE ELECTRODES

[75] Inventors: Eckart Buder, Kriftel; Friedrich-Wilhelm Busemann, Hagen, both of Fed. Rep. of Germany

[73] Assignee: Varta Batterie A.G., Hanover, Fed. Rep. of Germany

[21] Appl. No.: 197,208

[22] Filed: Oct. 15, 1980

[30] Foreign Application Priority Data

Oct. 25, 1979 [DE] Fed. Rep. of Germany ....... 2943101

[51] Int. Cl.$^3$ ............................................. H01M 4/88
[52] U.S. Cl. ................................. 252/182.1; 427/123; 429/60
[58] Field of Search ....................... 252/182.1; 429/60; 427/123

[56] References Cited

U.S. PATENT DOCUMENTS

| 3,057,942 | 10/1962 | Smith et al. | 429/60 |
| 3,170,818 | 2/1965 | Horn et al. | 429/60 |
| 3,288,643 | 11/1966 | Stark | 252/182.1 |
| 3,890,159 | 6/1975 | Thornton | 252/182.1 |
| 4,166,886 | 9/1979 | Bonnaterre | 429/60 |

Primary Examiner—Allan Lieberman
Attorney, Agent, or Firm—Weiser, Stapler & Spivak

[57] ABSTRACT

Negative sintered foil electrodes for gas-tight Ni/Cd storage batteries can be provided with a specific discharge reserve by subjecting them to a partial chemical reduction before they are installed. This is performed upon the moving, impregnated sinter tape by immersing it in or spraying it with a strongly reducing agent dissolved in water or any other solvent, preferably alkali boranate. In a subsequent drying step, the Cd so formed is permanently fixed and protected through intentional surface oxidation.

3 Claims, No Drawings

DISCHARGE RESERVE FOR NEGATIVE IMPREGNATED SINTER TAPE ELECTRODES

The invention relates to a method for manufacturing negative sintered foil electrodes for gas-tight Ni/Cd storage batteries having a discharge reserve.

In order to operate a gas-tight Ni/Cd storage battery with freedom from overcharging and polarity reversal, its electrodes must be so dimensioned that, both after being fully charged and after withdrawal of the entire useful capacity, continued current flow produces at one of the two electrodes only oxygen gas, which is then again consumed through reduction at the respective counter-electrode. Because the positive electrode generally determines the useful capacity when it is fully charged, the negative electrode may not yet have reached its fully charged capacity, but may still contain a certain quantity of chargeable mass, i.e. cadmium hydroxide, as a charge reserve. This interferes with the evolution of hydrogen during further charging of the tightly closed cell.

In addition, because of its comparatively stronger dependence upon loading, the negative electrode requires a greater proportion of charged negative mass than matches the charged positive mass, this is known as the discharge reserve.

The provision of the negative discharge reserve has heretofore been made by open forming. This has involved continuing to charge the not-yet-closed storage battery at both the positive and the negative electrode beyond the start of oxygen evolution at the positive one. In so doing, the negative electrode with its higher charge capacity receives an additional charge quantity. After closing of the storage battery and subsequent discharge to exhaustion of the useful capacity, which is limited by the positive electrode, there remains at the negative electrode the excess charge of unoxidized cadmium as discharge reserve. Also this does not change during further operation of the storage battery, except for unavoidable aging phenomena.

This open forming has disadvantages because the cells cannot be finally assembled and closed in a single step. The alkaline fumes which are unavoidably produced during overcharging, make it necessary to provide aspirating arrangements.

It is known, e.g. from U.S. Pat. No. 3,297,433, to produce active cadmium powder by wet chemistry, using reduction of cadmium compounds with aluminum or zinc, and to press these into dischargeable cadmium electrodes.

Another chemical treatment of active mass involves, in accordance with German Patent publication (Offenlegungsschrift) No. 2,361,905, thermally decomposing a mixture of cadmium and nickel formiate in a hydrogen current. This also yields a dischargeable mass consisting essentially of metallic cadmium.

In all these cases the chemical pretreatment always results in the residue-free transformation of a cadmium compound into cadmium metal. Because this cadmium metal is active, it can in principle be added to an existing mass as a specific discharge reserve.

In practice, however, this provision of the discharge reserve encounters difficulties because oxidation-free drying of the active cadmium is not always completely successful and because the active material which is utilized as the principal mass, itself, exhibits wide tolerances with respect to electrochemical current yield.

Accordingly, it is an object of the invention to provide a method for use with gas-tight Ni/Cd storage batteries equipped with sintered foil electrodes, which permits the introduction of a discharge reserve in a manner which is technologically simple and controllable.

This and other objects which will appear are achieved in accordance with the present invention by subjecting the electrode to a partial chemical reduction before installation.

A preferred way to practice the method embodying the invention involves treating the sintered tape electrodes by immersion or spraying with a solution of a reduceable material in an inorganic or organic solvent. Particularly suitable for the reduction treatment are negative sintered foils which do not exhibit wide variations in capacity or dimensions. Under those conditions the partial chemical reduction can be appropriately varied and controlled in accordance with previously determined parameters. In theory, in order to obtain a desired discharge reserve, the reducing means used must have a corresponding reduction equivalent. However, in arriving at the proper dosage, a partial spontaneous decomposition must be taken into account, which diminishes the yield. The rate of spontaneous decomposition depends upon the concentration and temperature of solution.

In principle, there may be used as the reducing means according to the invention all those materials which are well soluble in water or various organic solvents, and which change into their oxidation products at a potential which is below that of the $Cd/Cd^{++}$ redox potential. This includes nascent hydrogen, since the potential of the normal hydrogen electrode in alkaline solution (pH) is already more negative by 20 mV than the potential of the reaction $Cd(OH)_2 + 2e^- \rightleftarrows Cd + 2OH^-$.

Reducing means which are subject to oxidation at a standard potential below that of the normal hydrogen electrode, and which yield in so doing easily removable, mainly gaseous reaction products, are those which are listed below with their respective decomposition reactions. The potentials E are referred to $nH_2$ in similar solution.

Hydrazine

$E = -332$ mV

Hydroxilamine

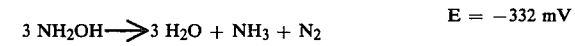

$E = -332$ mV

Formaldehyde

$E = -120$ mV

Sodium hypophosphite

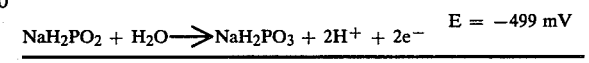

$E = -499$ mV

As additional reducing agent there can also be used nascent hydrogen. This may be produced, for example, during the spontaneous decomposition of the sodium hypophosphite in accordance with the formula $$NaH_2PO_2 + H_2O \rightarrow NaH_2PO_3 + H_2$$

It is particularly desirable to perform the chemical partial reduction of sinter foil electrodes in accordance with the invention using alkali boronate. In this regard, the very low normal potential $E_o = -1.23$ V (alkaline solution) of the reaction $$BH_4^- + 8OH^- \rightarrow H_2BO_3^- + 5H_2O + 8e^- \quad E = -402 \text{ mV}$$

represents a significant pre-requisite. The reducing effect, however, is also present in a neutral, aqueous medium. It is the greater, the more dilute the solution.

The atomic hydrogen which is developed with metal (here = Cd or Ni) in accordance with the expression $$2Me^{2+} + BH_4^- + 3OH^- \rightarrow 2Me^{\pm o} + 4H + H_3BO_3$$

recombines into $H_2$ more rapidly in the case of Ni, because of the lower separation overpotential, than with Cd. Therefore the presence of a larger quantity of Ni in addition to Cd in sinter foils means that a portion of the alkali boronate used for the reduction of the $Cd(OH)_2$ is unavailable. However, this is not a disadvantage because there is contemplated only a partial reduction of the cadmium hydroxide, and the metallic sinter frame is very largely covered by the active material which it holds.

In the continuous manufacture of the sintered tape electrodes, the reducing treatment embodying the invention can be carried out readily by immersion or spraying. This is done by drying the sinter tape impregnated with active mass after passing through the precipitating bath and then leading it through an additional bath containing the reducing solution. The length of this bath is so chosen that a given transit speed yields a dwell time which is sufficient to permit control of the reducing effect by means of bath concentration and temperature.

During the immersion or spray treatment, a reduced pressure is used in order to insure complete filling of all the pores with the reducing liquid. To this end, the bath takes the form of a closed chamber and has only slits at its ends for the entrance and exit of the tape. These are sealed from the outside atmosphere by means of rubber sleeves or the like.

Preferably the bath concentration is so selected that the solution quantity filling the pore volume is theoretically sufficient to react completely with the $Cd(OH)_2$. In this way, transformation of the entire $Cd(OH)_2$ impregnation is not possible, but its partial transformation into metallic cadmium is.

The partially reduced sinter tape is then subjected to washing with the same cleaning solvent which forms the basis for the reducing solution. In the simplest case this is water from which all salts have been removed. Here non-aqueous solvents have the advantage because their volatility makes it possible to remove them during the concluding drying using less heat. For example, trichlorethylene may be used (Kp=87° C.), or isopropyl alcohol (Kp=82.3° C.).

In the drying stage the dischargeable cadmium which has been formed is finally fixed and simultaneously protected. This may be done, for example, by forming upon the cadmium a hair-thin oxide cover layer using a dosed quantity of oxygen. This protects the active material from further oxidation during cell assembly. Because the drying takes place under specified conditions of duration, temperature and humidity content of the drying atmosphere, as well as its gas composition, the process embodying the invention makes it possible to precisely provide the desired discharge reserve.

We claim:

1. A method for producing negative sintered foil electrodes for gas-tight Ni/Cd storage batteries, which have cadmium hydroxide as the active mass and which have a discharge reserve in the form of a fraction of metallic cadmium, the method comprising
    subjecting the electrode to a partial chemical reduction before installation by immersion or spraying with the solution of a reducing material in an inorganic or organic solvent, the reducing material being an alkali boronate.

2. The method of claim 1 further comprising
    washing the sinter foil electrode with clean solvent and drying it under controlled conditions.

3. The method of claim 2 further comprising
    protecting the cadmium by performing the drying utilizing a dosed quantity of oxygen, thereby forming upon the cadmium a thin oxide cover layer.

* * * * *